US011691394B2

(12) United States Patent
Rosbrook et al.

(10) Patent No.: US 11,691,394 B2
(45) Date of Patent: Jul. 4, 2023

(54) PET RESISTANT ENGINEERED HARDWOOD FLOOR AND METHOD OF MAKING

(71) Applicant: Pet Decorator, LLC, Tukwila, WA (US)

(72) Inventors: Tamar Michaels Rosbrook, Tukwila, WA (US); William M. Friend, Boucherville (CA); Eda Shu, Shenzhen (CN)

(73) Assignee: Pet Decorator, LLC, Tukwila, WA (US)

( * ) Notice: Subject to any disclaimer, the term of this patent is extended or adjusted under 35 U.S.C. 154(b) by 112 days.

(21) Appl. No.: 16/993,065

(22) Filed: Aug. 13, 2020

(65) Prior Publication Data

US 2021/0046742 A1    Feb. 18, 2021

Related U.S. Application Data

(60) Provisional application No. 62/886,817, filed on Aug. 14, 2019.

(51) Int. Cl.

| | | |
|---|---|---|
| *B32B 21/14* | (2006.01) | |
| *B32B 7/12* | (2006.01) | |
| *B32B 21/08* | (2006.01) | |
| *B32B 27/20* | (2006.01) | |
| *B32B 27/22* | (2006.01) | |
| *B32B 27/32* | (2006.01) | |
| *B32B 37/10* | (2006.01) | |
| *B32B 3/06* | (2006.01) | |
| *B32B 33/00* | (2006.01) | |
| *B05D 7/06* | (2006.01) | |
| *C09D 5/00* | (2006.01) | |
| *C09D 5/14* | (2006.01) | |
| *C09D 7/61* | (2018.01) | |
| *B32B 37/12* | (2006.01) | |
| *B32B 37/14* | (2006.01) | |
| *B32B 37/16* | (2006.01) | |
| *B05D 3/06* | (2006.01) | |
| *B05D 7/00* | (2006.01) | |
| *B32B 38/00* | (2006.01) | |
| *C09D 5/16* | (2006.01) | |
| *C09D 175/04* | (2006.01) | |
| *B32B 27/30* | (2006.01) | |

(52) U.S. Cl.
CPC .............. *B32B 21/14* (2013.01); *B05D 3/067* (2013.01); *B05D 7/06* (2013.01); *B05D 7/56* (2013.01); *B32B 7/12* (2013.01); *B32B 21/08* (2013.01); *B32B 27/20* (2013.01); *B32B 27/22* (2013.01); *B32B 27/304* (2013.01); *B32B 27/32* (2013.01); *B32B 37/10* (2013.01); *B32B 37/1284* (2013.01); *B32B 37/144* (2013.01); *B32B 37/16* (2013.01); *B32B 38/0012* (2013.01); *C09D 5/1618* (2013.01); *C09D 175/04* (2013.01); *B05D 2503/00* (2013.01); *B32B 2255/08* (2013.01); *B32B 2255/26* (2013.01); *B32B 2305/72* (2013.01); *B32B 2307/10* (2013.01); *B32B 2307/308* (2013.01); *B32B 2307/554* (2013.01); *B32B 2307/584* (2013.01); *B32B 2307/7145* (2013.01); *B32B 2307/72* (2013.01); *B32B 2307/7265* (2013.01); *B32B 2323/04* (2013.01); *B32B 2471/00* (2013.01)

(58) Field of Classification Search
None
See application file for complete search history.

(56) References Cited

U.S. PATENT DOCUMENTS

| | | | |
|---|---|---|---|
| 2010/0062241 A1* | 3/2010 | Ducharme | .............. B32B 33/00 428/327 |
| 2014/0109507 A1* | 4/2014 | Dossche | ................. B32B 21/14 428/455 |

* cited by examiner

*Primary Examiner* — Sheeba Ahmed
(74) *Attorney, Agent, or Firm* — Seed Intellectual Property Law Group LLP

(57) ABSTRACT

A floor plank having a rigid, composite core having an upper side and a underside, the core being thermally stable and formed of PVC and calcium carbonate material that does not include ortho-phthalates, a wood veneer having a lower surface on the upper side of the core and further including an exposed surface, a protective coating on the exposed surface of the wood veneer, the protective coating formed of catalyzed polyurethane having aluminum oxide particles, and a thermo-acoustic cushion coating on the back surface of the core. A method of making is also provided.

27 Claims, 4 Drawing Sheets

PET RESISTANT ENGINEERED HARDWOOD FLOOR AND METHOD OF MAKING

BACKGROUND

Technical Field

The present disclosure relates to multilayer flooring and, more particularly, to a multi-layer hardwood floor with a composite PVC core and wood veneer having a protective finish that is pet-resistant and the manufacturing method thereof.

Description of the Related Art

Currently, the warranties of solid and engineered hardwood flooring sold in the market specifically warrant against all damages caused by pets.

This situation leaves consumers with pets, especially medium to larger sized dogs, unable to purchase a genuine hardwood floor that is warranted against any form of damage caused by the pets, including physical damage from dog claws, as well as from damage caused by urine and feces accidents. This limits the flooring options that are available to consumers with pets who want a warranted floor, and owners are forced to use other types of flooring that excludes genuine hardwood floors. This product option limitation poses a significant problem when planning renovations and home décor designs where the beauty and value of genuine wood is desired for the consumer's floor.

Conventional solid and engineered hardwood floors are manufactured by hundreds of manufacturers worldwide. Their solid and engineered hardwood floors are designed for either residential use or light commercial use; however, in both cases these floors are not designed to resist, nor are they warranted against, the damages of pet nails and claws and pet urine and feces damage. The finish of the floor surface is too soft and is unable to resist the concentrated force applied by pet nails and the wood fiber core of their products is easily damaged by moisture. Due to these design and performance limitations, conventional solid and engineered hardwood floors do not warrant against the damage caused by pets, including nail scratches, urine and feces. Hence, such floors are unsuitable to consumers with pets, especially medium to larger dogs. Problems with conventional solid and engineered hardwood floors when installed in a home with a medium to large dog include: (1) extensive permanent surface denting and scratching from the dog's claws; and (2) in the event of a urine and feces accident, the urine will soak into the wood core and upper veneer of the floor, causing permanent stains, as well as penetration and leaking through the floor's seams to the subfloor, which may create potential odor and hygiene issues. Pet owners need a viable solution for a genuine hardwood floor that is resistant to the foregoing damage and which carries a pet resistant warranty.

SUMMARY OF THE DISCLOSURE

The technical problem to be solved by the present disclosure is to provide a multilayered engineered hardwood floor that can resist the damage caused by pet claws and nails, urine, and feces. The floor must carry a warranty, provide consumers with a long service life span, and be suitable for installation in a wide range of temperature, humidity, and installation site conditions.

Additionally, the floor must not contain ortho-phthalates, which have been commonly used in the manufacture of vinyl based flooring products.

The floor finish should be exceptionally hard, durable, scratch resistant, stain resistant, and transparent so that the aesthetics of the hardwood show through without any appreciable loss of visual quality. Additional to these qualities, the finish must also have a very high bond strength to the hardwood veneer.

In accordance with one aspect of the present disclosure, a floor plank is provided that includes a rigid, composite core having an upper side and a underside, the core being thermally stable and formed of PVC and calcium carbonate material that does not include ortho-phthalates, a wood veneer having a lower surface on the upper side of the core and further including an exposed surface, a protective coating on the exposed surface of the wood veneer, the protective coating formed of catalyzed Polyurethane having aluminum oxide particles, and a thermo-acoustic cushion coating on the back surface or underside of the core.

In accordance with another aspect of the present disclosure, the protective coating is a catalyzed polyurethane and aluminum oxide coating, preferably UV catalyzed.

In accordance with another aspect of the present disclosure, silver ions (Ag+) are included to provide antimicrobial control.

In accordance with yet another aspect of the present disclosure, the wood veneer comprises a hardwood veneer having a thickness in the range of 0.4 mm to and including 2.0 mm in thickness, and it is glued to the core.

In accordance with a further aspect of the present disclosure, the composite core has a thickness in the range of 3.5 mm to 8.0 mm and is formed of non-formed material. Ideally the core has a density (specific gravity) in the range of 2.0 grams per cm$^3$ to and including 2.4 grams per cm$^3$.

In accordance with yet another aspect of the present disclosure, the thermo-acoustic cushion is constructed from cross-linked virgin polyethylene with a thickness in the range of 1.0 mm to and including 1.5 mm.

In accordance with still yet a further aspect of the present disclosure, the floor plank has an expansion contraction coefficient that is less than 0.04% between the temperatures of 10° C. and 40° C., and the floor can withstand high surface temperatures of up to 50° C. when the floors are exposed to direct sunlight. Ideally, the plank is dimensionally stable in humidity levels ranging from 15% RH to 75% RH.

In accordance with another aspect of the present disclosure, the plank core is formed of polyvinylchloride (PVC) powder from 20% to and including 40% by weight, extra-fine calcium carbonate (CaCO$_3$) from 60% to and including 80% by weight, stabilizer salts from 1% to and including 3% by weight, plasticizer from 1% to and including 2% by weight, lubricants from 0.4% to and including 1% by weight, and pigments from 0.4% to and including 1% by weight. Preferably, the core is ultra-low in volatile organic compound (VOC) content.

In accordance with a further aspect of the present disclosure, the attached cushion includes cross-linked virgin polyethylene (IXPE), has a thickness in the range of 1.0 mm to and including 1.5 mm thick. Preferably, the cushion is formed from one among cross-linked virgin polyethylene, agglomerated cork, rubber, and ethylene-vinyl acetate (EVA).

In accordance with still yet another aspect of the present disclosure, a modified locking tongue-and-groove profile is formed on the sides and ends of the plank that enables locking the planks together with adjacent planks to enable the plank to be installed in either a floating or glue-down method.

In accordance with yet another aspect of the present disclosure, each plank includes a pair of opposing long sides and a pair of opposing short sides, and each long side has a click-type modified tongue and groove profile that locks adjacent planks together along their adjacent long sides and each short side has a drop-lock end profile that locks ends of adjacent planks together.

It will be readily appreciated that the present disclosure can be implemented in the form of a floor having a plurality of planks connected together, with one or more of the planks having the construction described above or made in accordance with the method or methods described herein below.

In accordance with a method of making a plank in accordance with the present disclosure, the following method is a representative implementation of method in accordance with the present disclosure:

- mixing all constituents in dry powder form into a homogeneous powdered mixture in a blending machine at between 1500 to 3500 RPM for 5 to 10 minutes;
- heating the powdered mixture;
- extruding the heated powdered mixture under pressure through an adjustable mold at a temperature of between 180° C. and 220° C. in a continuous process to form extruded composite core blank material;
- cutting the extruded composite core blank material into a composite core blank of a rectilinear width and length;
- allowing the composite core blank to stabilize for 3 to 5 days at a temperature in the range of 18° C. to and including 25° C.;
- surface sanding the composite core blank on one surface using sandpaper having a grit number in the range of number 60 to and including number 80;
- drying in a kiln a hardwood veneer having a thickness in the range of 0.4 mm to and including 2.0 mm to a moisture content in the range of 6% to and including 12% moisture content by weight;
- running an individual rigid composite core blank through a roller-type glue applicator that applies a moisture resistant polyurethane type adhesive at a rate in the range of 60 g/m$^2$ to and including 160 g/m$^2$ in response to the hardwood veneer's thickness and species of hardwood;
- layering the kiln dried hardwood veneer onto the sanded surface of the composite core blank;
- pressing the layer of hardwood veneer and composite core blank in a hydraulic press in a range of 150 psi to and including 250 psi for a period of time in the range of 3 hours to and including 6 hours in response to an ambient temperature that is within the range of 5° C. to and including 35° C. to adhere the layered hardwood veneer and the composite core blank to one another and form a plank;
- after the pressing, the plank is palletized and allowed to stabilize for 2-4 days;
- after stabilization, the plank is milled to first cut a modified locking tongue-and-groove profile on long sides of the plank, after which a locking profile is formed on short sides of the plank; and
- coating the hardwood veneer with a UV catalyzed polyurethane coating having aluminum oxide particles. Ideally silver ions (Ag+) are included for antimicrobial control.

In accordance with another aspect of the foregoing, the method includes forming a bevel along four edges of hardwood veneer on the plank at an angle in the range of 15° to and including 45° to allow for a coating of the edges of the hardwood veneer.

In accordance with a further aspect of the foregoing method, the coating applied to the surface of the hardwood veneer includes 10 coats:

Coat #1 comprising a water based adhesion/bonding layer of 10 g/m$^2$ to and including 15 g/m$^2$ surface density;

Coat #2 comprising a water resistant polyurethane layer of 20 g/m$^2$ to and including 30 g/m$^2$ surface density;

Coat #3 comprising a flexible polyurethane layer of 12 g/m$^2$ to and including 16 g/m$^2$ surface density;

Coat #4 comprising a wear resistance polyurethane layer of 20 g/m$^2$ to and including 30 g/m$^2$ surface density;

Coat #5 comprising a wear resistance polyurethane layer of 20 g/m$^2$ to and including 30/m$^2$ surface density;

Coat #6 comprising a polyurethane hardening layer of 14 g/m$^2$ to and including 20 g/m$^2$ surface density;

Coat #7 comprising a polyurethane filler/leveling layer of 10 g/m$^2$ to and including 15 g/m$^2$ surface density;

Coat #8 comprising a low gloss polyurethane filler layer of 8 g/m$^2$ to and including 12 g/m$^2$ surface density;

Coat #9 comprising an aluminum oxide anti-scratch layer of 5 g/m$^2$ to and including 8 g/m$^2$ surface density; and Coat #10 comprising an aluminum oxide anti-scratch layer of 4 g/m$^2$ to and including 6 g/m$^2$ surface density.

In accordance with another aspect of the present disclosure, the coating #10 includes a silver ion (Ag+) concentration of about 0.3% for antimicrobial control.

In accordance with another aspect of the present disclosure, the milling of the planks includes forming a "click" type modified tongue and groove profile that locks adjacent planks together on their adjacent long sides, and after the long-side of the planks is milled, the machine then cuts a "drop-lock" profile that locks the ends of adjacent planks together on their adjacent short sides. The modified tongue and groove profile locks planks together on their long side as well on the ends of the planks to lock the end-seams of the planks together tightly and securely.

In accordance with still yet another aspect of the foregoing method, after exiting the extruder, the method includes passing the composite core blank through a series of heated calibration rollers to give the composite core blank a calibrated thickness of between 3.5 mm and 8.0 mm.

In accordance with a further aspect of the foregoing method, the pressing includes using a silicone gel pad to distribute even pressure across the surface area of the layered hardwood veneer and the composite core blank.

As will be readily appreciated from the foregoing, the rigid composite core of the floor will achieve very specific qualities to be able to withstand the forces and conditions that are exerted upon it as follows:

High degree of thermal stability: the floor must not expand or contract more than 0.04% when there are seasonal and daily temperature changes between 10° C. and 40° C.

Will not be affected by or absorb moisture: The core of the disclosure must resist all possible effects of water or moisture; in particular, it must not absorb moisture.

Adhesive compatibility and bond strength: Must be compatible to bond with wood using a moisture resistant polyurethane based glue that achieves a very high-strength permanent bond.

Will be very rigid and able to resist the lateral stresses exerted on it by the wood veneers so that the surface of the boards remains exceptionally flat.

Will be very strong: The core's structural strength is crucial to its long-term performance since the floor may be installed either floating or glued down. The core will have a modified locking tongue-and-groove click profile with a drop-locking profile on the ends which will have significant forces exerted on them.

To achieve this level of performance, a representative implementation for the rigid composite core includes the following:

Polyvinylchloride (PVC) powder from 20 to 40% by weight;
Extra-fine calcium carbonate ($CaCO_3$) from 60 to 80% by weight;
Stabilizer salts from 1 to 3% by weight;
Plasticizer from 1 to 2% by weight;
Lubricants from 0.4 to 1% by weight; and
Pigments from 0.4 to 1% by weight.

The structure of the floor in accordance with one representative implementation includes the following:

Finish: 10 coat catalyzed polyurethane and aluminum oxide ranging from 123 to 182 grams per square meter;
Wood veneer from 0.4 mm to 2.0 mm in thickness;
Composite rigid core with a thickness of between 3.5 mm to 8.0 mm; and
Attached "cross-linked" virgin polyethylene (IXPE) cushion thickness between 1.0 to 1.5 mm thick. Alternate types of thermo-acoustic underpad/cushions may be used with the disclosure including, but not limited to: Agglomerated cork, rubber, ethylene-vinyl acetate (EVA).
Use of silver ions (Ag+) are included for antimicrobial control.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
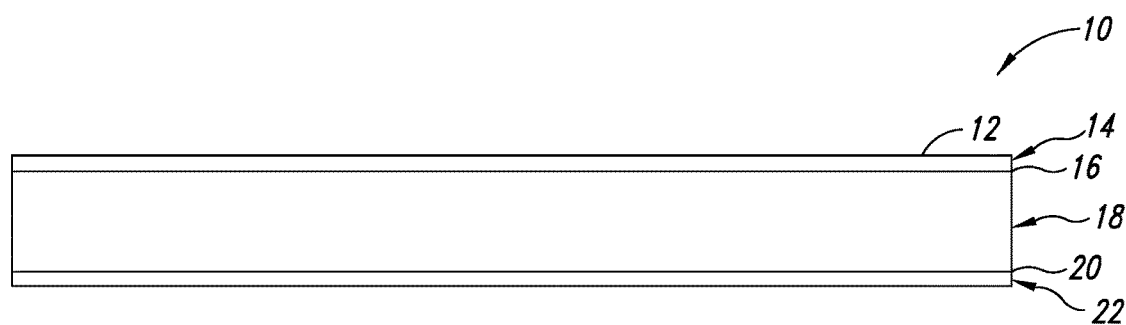
FIG. 1 is a structural cross-sectional side view of an assembled pet resistant engineered hardwood floor formed in accordance with one implementation of the present disclosure.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with subflooring, tongue-and-groove joining system for floor planks, including a locking tongue-and-groove joining system, as well as machinery and equipment used to form laminated products, floor panels, and wood veneers, and to apply finish, have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments. All ranges shown include the upper and lower limits unless otherwise specified.

The present disclosure provides a pet resistant engineered hardwood floor that is moisture resistant due in part to its rigid composite core. The floor's unique coating and structural properties give it the ability to resist most damages caused by dog claws, as well as to resist the damages caused by pet urine and feces accidents. The present disclosure provides pet owners with hardwood flooring options having the same types of aesthetic qualities as other types of hardwood floors that have a limited warranty against damage caused by pet urine and feces accidents.

Important criteria aside from pet damage resistance for the present disclosure is that the formulation of the rigid composite core provides an exceptionally rigid and strong, yet flexible and thermally stable, product across a wide range of temperatures and humidity levels, including when exposed to direct sunlight.

By way of general introduction, the flooring of the present disclosure can be implemented in the form of individual planks that include a rigid composite core, a hardwood decorative veneer on a first side of the core, and a cushion layer on the opposing second side of the core. The core is primarily made of PVC and calcium carbonate. A health and safety criteria for the formulation of the rigid composite core is that it not contain any ortho-phthalates, which are commonly found in products containing PVC, and that the flooring be ultra-low in volatile organic compound (VOC) content. Ortho-phthalates are an endocrine disruptor, known carcinogen, and are believed to affect human reproduction and development. VOC's are solvents that when released indoors are a health hazard and can create allergic reactions in persons with VOC sensitivities.

The decorative genuine hardwood veneer is applied to the core. The wood veneer is sealed and protected with a specially formulated catalyzed polyurethane coating that contains aluminum oxide particles to provide enhanced wear-resistance against abrasion.

The underside of the planks has an attached thermo-acoustic cushion made from "cross-linked" virgin polyethylene (IXPE) with a cushion thickness between 1.0 to 1.5 mm thick, which provides several benefits including: (1) sound deadening which minimizes the transfer of footfall noise from room to room and floor to floor; (2) acting as a thermal break when the floor planks are installed over an on-grade concrete slab, thereby creating a warmer floor surface; and (3) giving the floor a shock-absorbing quality, which makes it more comfortable to walk on.

Alternate types of thermo-acoustic underpad or cushions may be used, such as without limitation agglomerated cork, rubber, ethylene-vinyl acetate (EVA).

Planks incorporate a patented modified locking tongue-and-groove profile that locks planks together on their long side, as well as a patented drop-lock profile on the ends of the planks that locks the end-seams of the planks together tightly and securely. These patented profile systems allow for the floor to be installed in either a floating or glue-down method. Additionally, the patented profiles create exceptionally tight fitting seams that minimize the ability for moisture from spills or pet accidents to seep through the floor.

Rigid Composite Core Composition

Polyvinylchloride (PVC) powder from 20 to 40% by weight, extra-fine calcium carbonate ($CaCO_3$) from 60 to 80% by weight, stabilizer salts from 1 to 3% by weight, plasticizer from 1 to 2% by weight, lubricants from 0.4 to 1% by weight and pigments from 0.4 to 1% by weight. The density (specific gravity) of the rigid composite core is between 2.0 to 2.4 grams per $cm^3$.

The rigid composite core is of a thickness ranging from 3.5 mm up to and including 8.0 mm. The core is a 100% solid structure (non-foamed) to achieve the maximum possible hardness, strength and rigidity possible. The rigid composite core is produced by the following process: (1) all ingredients are mixed in dry powder form into a homogeneous mixture in a blending machine in the range of 1500 RPM to and including 3500 RPM for 5-10 minutes; (2) the powdered mixture is augured into a thermal extruder where it is heated and extruded under pressure through an adjustable mold at a temperature of between 180° C. and 220° C. in a continuous process at the desired thickness; (3) the extruded material is cut into blanks of the desired width and length; (4) the rigid composite core blanks are left to stabilize for 3 to 5 days at a temperature of 18° C.-25° C.; and (5) the rigid composite core blanks are surface sanded on one side by an inline belt sander using sandpaper belts with a grit number in the range of #60 to and including #80.

Attached Cross Linked Polyethylene (IXPE) Thermo Acoustic Cushion

The thermo-acoustic cushion is glued to the rigid composite core using a moisture resistant polyurethane based glue that is compatible with the IXPE CUSHION rigid composite core. Alternate types of thermo-acoustic underpad/cushions may be used with the disclosure including, but not limited to: Agglomerated cork, rubber, ethylene-vinyl acetate (EVA).

Click Type Locking System

The planks preferably have a rectilinear shape or rectangular planform profile with mutually opposing and parallel long sides and mutually opposing and parallel short sides that form the ends of the planks. The long sides are milled on a high-precision double tenon type milling machine that cuts a "click" type modified locking tongue-and-groove profile that locks adjacent planks together on their respective long side. Such modified locking tongue-and-groove profiles are well-known to those skilled in the art and will not be described in detail herein. After the long side of the planks is milled, the machine then cuts a "drop-lock" profile that locks the ends of planks together on their short side. The drop-lock profile is also well-known in the art and will not be described in detail herein.

Bevels are applied to the four upper edges of the planks at an angle in the range of 15° to and including 45° to allow for a thorough coating of the edges of the hardwood veneers to seal and protect them against post-installation moisture, pet urine, feces, and other contaminants.

The manufacturing process thereof is further explained below.

Wood Veneer

The flooring planks have a genuine wood veneer which provides authentic hardwood décor options in a wide range of colors, styles, and species options that are similar and identical to conventional solid and conventional engineered hardwood floors.

Hardwood veneer species options for the disclosure include but are not limited to: European White Oak, North American Red Oak, North American Hard (Sugar) Maple, North American Yellow Birch, North American Hickory, Southeast Asian Acacia, North American Cherry, and North American Walnut. Hardwood veneers may be of either a sliced or peeled type.

Hardwood veneers may be different thicknesses depending on the thickness and width of the floor desired by the consumer. Veneer thickness can range 0.4 mm to 2.0 mm.

Kiln dried hardwood veneers are glued/bonded to the rigid composite core of the flooring using a polyurethane based glue that is compatible with, and which achieves, a very high bond strength to, both the wood and the composite core, as well as being resistant to damage and bond strength weakening by contact with moisture.

Before the gluing process of the hardwood veneers to the rigid composite core, the veneers are kiln dried to moisture content of between 6% to 12% moisture content by weight.

Coating System

The wood veneer of the flooring is finished or coated with a 10-coat Ultraviolet light (UV) catalyzed Polyurethane coating system that contains aluminum oxide particles for superior scratch and wear resistance. The details of the coating system are as follows:

| | |
|---|---|
| Coat # 1- Water based adhesion/bonding layer: | 10-15 $g/m^2$; |
| Coat # 2- Water resistant polyurethane layer | 20-30 $g/m^2$; |
| Coat # 3- Flexible polyurethane layer: | 12-16 $g/m^2$; |
| Coat # 4- Wear resistance polyurethane layer: | 20-30 $g/m^2$; |
| Coat # 5- Wear resistance polyurethane layer: | 20-30 $g/m^2$; |
| Coat # 6- Polyurethane hardening layer | 14-20 $g/m^2$; |
| Coat # 7- Polyurethane filler/leveling layer: | 10-15 $g/m^2$; |
| Coat # 8- Low gloss polyurethane filler layer: | 8-12 $g/m^2$; |
| Coat # 9- Aluminum Oxide anti-scratch layer: | 5-8 $g/m^2$; and |
| Coat # 10- Aluminum Oxide anti-scratch layer: | 4-6 $g/m^2$. |

Composite Planks

The composite core is adhered, bonded, or otherwise attached to the wood veneer. The gluing process involves the following steps: (1) individual rigid composite core strips are run through a roller type glue applicator that calibrates the quantity of glue applied (glue application rates vary from 60 $g/m^2$ to 160 $g/m^2$ depending on the veneer's thickness and species of wood); (2) the veneers are pressed to the rigid composite core at between 150 to 250 psi for between 3-6 hours depending on the ambient temperature (the temperature range for pressing is 5° C. to 35° C.; a silicone gel pad is used during pressing process to ensure even pressure across all surface areas of the veneers and the rigid composite core for optimal and consistent glue bond strength); and (3) after gluing, the assembled panels are palletized and allowed to stabilize for 2-4 days Product Features 1. Pet Resistance. The catalyzed polyurethane and aluminum oxide coating system is highly resistant to the damages caused by the nails/claws of dogs, including medium to large sized dogs. Planks are able to resist most denting and scratching type damage. Additionally, the finish is not affected, stained or damaged in any way by water, pet urine, feces and all types of food stuffs and beverages.

2. Health and Safety. The disclosure is orth-phthalate free and ultra-low VOC content.

3. Thermal Stability. The disclosure has exceptional dimensional stability across a wide range of indoor temperatures, and contraction and expansion rates. Expansion contraction coefficient is less than 0.04% between 10° C. and 40° C. Additionally, the planks can withstand high surface temperatures when the floors are exposed to direct sunlight (when floors are adjacent to large windows and patio doors with a southern exposure) without expansion, deformation or other adverse effects.

4. Humidity Stability. The disclosure has exceptional structural and dimensional stability across a wide range of indoor relative humidity (RH) levels; planks are minimally affected by both low (below 30% RH) and high (above 50% RH) levels. Floors may be installed in environments ranging from 15% RH to 75% RH.

5. Structural Strength and Flexibility. The planks are very strong with excellent tensile strength, yet are flexible so that they can follow the gentle contours/undulations typical of subfloors without damage or stress to the rigid composite core when walked upon or bearing heavy static loads from furniture, pool tables or other heavy loads. Additionally, the planks are able to resist deformation such as cupping, crowning and bowing which are common problems with conventional hardwood flooring products.

6. Long-Term Durability. The disclosure is highly durable and has a long life span such that it carries a limited lifetime residential warranty.

7. Aesthetics. The disclosure has the visual qualities and character consumers desire that is typical of genuine hardwoods and can be stained and processed to offer a wide range of colors and styles.

8. The planks have an attached 1.0 to 1.5 mm thick thermo-acoustic cushion made of "cross-linked" virgin polyethylene (IXPE) which provides sound deadening qualities, acts as a thermal break when installed over an on-grade concrete slab, thereby creating a warmer floor surface, and the floor a shock-absorbing quality making it more comfortable to walk on. Alternate types of thermo-acoustic underpad/cushions may be used with the disclosure including, but not limited to: Agglomerated cork, rubber, ethylene-vinyl acetate (EVA).

9. Planks incorporate a patented modified locking tongue-and-groove profile that locks planks together on their long side, as well as a patented drop-lock profile on the ends of the planks that locks the end-seams of the planks together tightly and securely. These patented profile systems allow the floor to be installed in either a floating or glue-down method. In addition, these patented profiles also create exceptionally tight fitting seams that minimize the ability of moisture from spills or pet accidents to seep through the floor.

The following text will further describe the embodiment of the present disclosure and the manufacturing method thereof with reference to the accompanying drawings.

Figure 2:
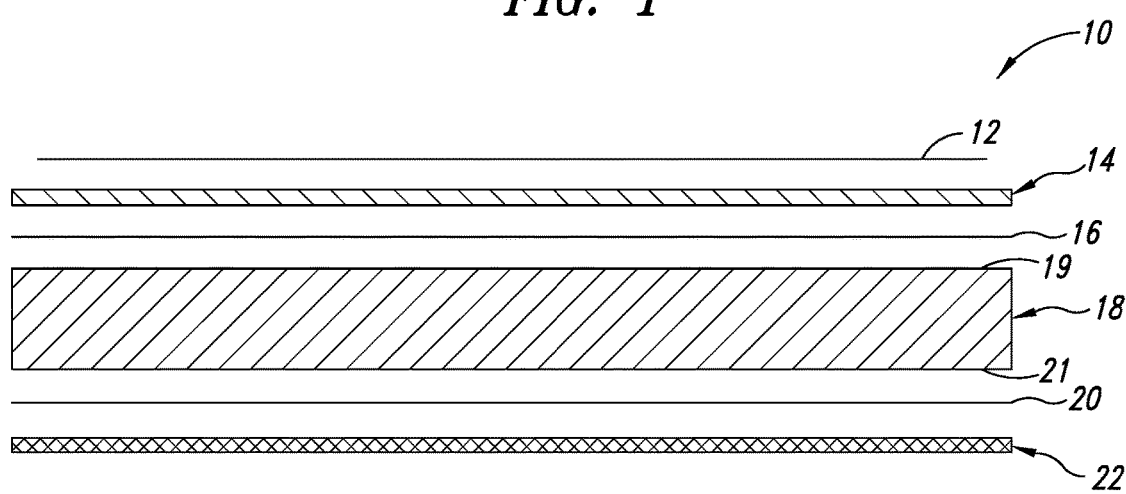
FIG. 2 is an exploded cross-sectional side view of the floor panel of FIG. 1 formed in accordance with the present disclosure.
Figure 3:
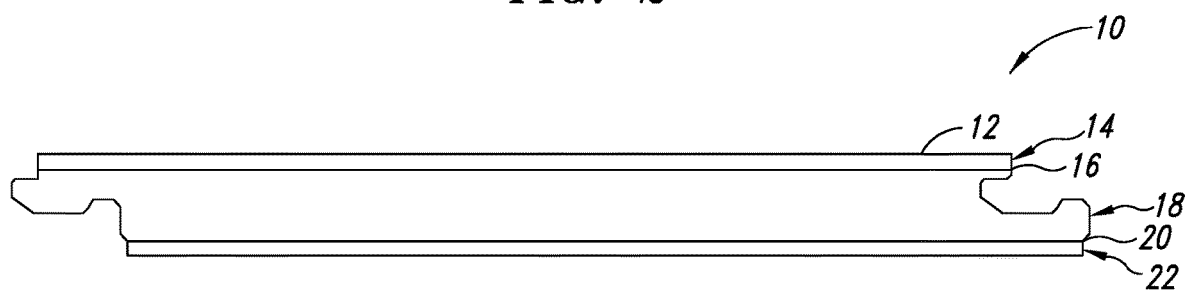
FIG. 3 is a side elevation of a floor panel illustrating a locking tongue-and-groove joining system with wood veneer wear-layer.
Figure 4:
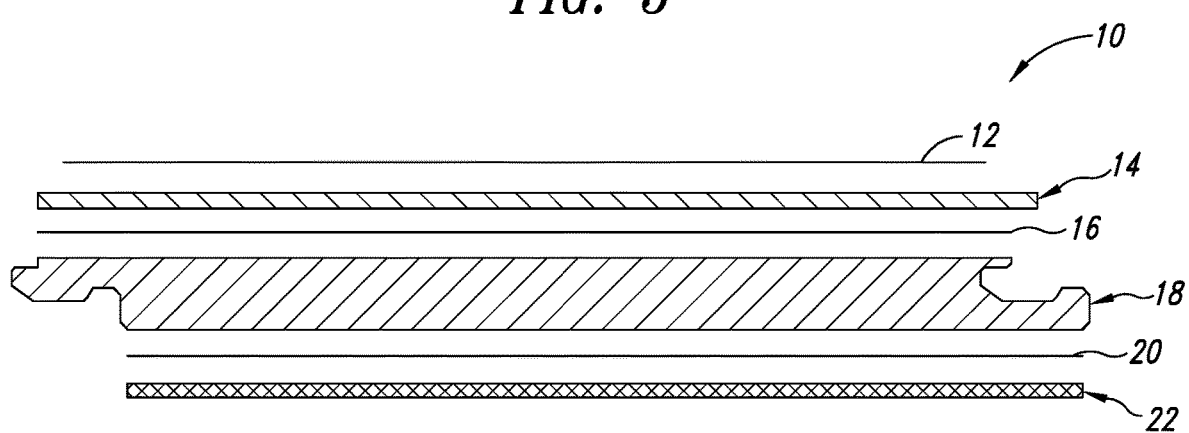
FIG. 4 is an exploded side elevation of the floor panel of FIG. 3 illustrating a layer of polyurethane based glue that is compatible with both the hardwood veneer and the composite core in accordance with the present disclosure.

FIGS. 1 and 2 represent a plank 10 formed in accordance with the current disclosure. The plank 10 comprises a pet resistant engineered hardwood floor with a high-strength rigid composite core 18, primarily made from PVC and Calcium Carbonate, an upper wear-layer of hardwood veneer 14 that is attached to an upper side 19 of the core 18, which is prefinished (coated) with a 10-coat ultraviolet light (UV) catalyzed polyurethane coating 12, and which has a pre-attached thermo-acoustic "cross-linked" virgin polyethylene (IXPE) cushion 22 on its underside 21.

The coating 12 represents the 10-coat ultraviolet light (UV) catalyzed polyurethane coating system that contains aluminum oxide particles for superior scratch and wear resistance. The details of the coating system are as follows:

Coat #1 comprising a water based adhesion/bonding layer of 10 $g/m^2$ to and including 15 $g/m^2$ surface density;

Coat #2 comprising a water resistant polyurethane layer of 20 $g/m^2$ to and including 30 $g/m^2$ surface density;

Coat #3 comprising a flexible polyurethane layer of 12 $g/m^2$ to and including 16 $g/m^2$ surface density;

Coat #4 comprising a wear resistance polyurethane layer of 20 $g/m^2$ to and including 30 $g/m^2$ surface density;

Coat #5 comprising a wear resistance polyurethane layer of 20 $g/m^2$ to and including $30/m^2$ surface density;

Coat #6 comprising a polyurethane hardening layer of 14 $g/m^2$ to and including 20 $g/m^2$ surface density;

Coat #7 comprising a polyurethane filler/leveling layer of 10 $g/m^2$ to and including 15 $g/m^2$ surface density;

Coat #8 comprising a low gloss polyurethane filler layer of 8 $g/m^2$ to and including 12 $g/m^2$ surface density;

Coat #9 comprising an aluminum oxide anti-scratch layer of 5 $g/m^2$ to and including 8 $g/m^2$ surface density; and Coat #10 comprising an aluminum oxide anti-scratch layer of 4 $g/m^2$ to and including 6 $g/m^2$ surface density.

The entirety of the above coating system is bonded to the wood veneer 14.

The wood veneer 14 wear-layer is preferably formed of hardwood veneer. The hardwood veneer species options include without limitation European White Oak, North American Red Oak, North American Hard (Sugar) Maple, North American Yellow Birch, North American Hickory, Southeast Asian Acacia, North American Cherry, and North American Walnut. Hardwood veneers may be either sliced or peeled type. Hardwood veneers may be different thicknesses from 0.4 mm to 2.0 mm. The wood veneer wear-layer 14 is glued and bonded to the upper side 19 of the core 18 with a layer of polyurethane based glue 16 that is compatible with both the hardwood veneer 14 and the composite core 18. Glue application rates vary from 60 $g/m^2$ to 160 $g/m^2$. The polyurethane based glue layer 16 bonds the hardwood veneer 14 as shown in FIGS. 1 and 2.

The core 18 is comprised of polyvinylchloride (PVC) powder from 20% to 40% by weight. The powder includes the following constituents:

Extra-fine calcium carbonate ($CaCO_3$) from 60 to 80% by weight;

Stabilizer salts from 1 to 3% by weight;

Plasticizer from 1 to 2% by weight;

Lubricants from 0.4 to 1% by weight; and

Pigments from 0.4 to 1% by weight.

The foregoing constituents are individually readily commercially available and known to those skilled in the art, although the combination described above is novel and non-obvious.

The density (specific gravity) of the rigid composite core 18 is between 2.0 to 2.4 grams per $cm^3$. Ideally the core 18 is formed to have a final thickness ranging from 3.5 mm up to and including 8.0 mm. The core is a 100% solid structure (non-foamed) to achieve the maximum possible hardness, strength, and rigidity.

The exceptional dimensional stability of the core 18 across a wide range of indoor temperatures in the range of 10° C. to and including 40° C. is important to the performance and stability of the plank and ultimate floor constructed from one or more of these planks. Its expansion contraction coefficient of less than 0.04% makes the core 18 compatible with the hardwood veneer layer 14 across this same wide range of indoor temperatures of 10° C.-40° C., wherein the plank 10 will not expand, contract, warp or deform, and it will maintain its desired flat appearance. Additionally, the plank 10 can withstand high surface temperatures without expansion, deformation or other adverse effects when the floor is exposed to direct sunlight, such as when a floor is adjacent to large windows and patio doors with a southern exposure.

The very high density and hardness of the core 18 contributes significantly to the superior level of dent resistance compared to conventional solid and engineered hardwood floors. In addition, the high density and hardness makes the core 18 impervious to denting from the common causes, thereby limiting surface denting to within the depth of the hardwood veneer 14.

A health and safety criteria was for the formulation of the rigid composite core 18 not to contain any ortho-phthalates, which are commonly found in products containing PVC. In addition, the floor should be ultra-low in volatile organic compound (VOC) content. The formulation used in the plank 10 is ortho-phthalate free.

The layer of polyurethane based glue 20 is compatible with both the IXPE cross-linked polyethylene underpad or cushion 22 and the composite core 18. Glue application rates vary from 40 g/m² to 80 g/m². The polyurethane based glue 20 bonds the core 18 to the attached cross linked polyethylene (IXPE) thermo acoustic cushion 22.

The cross linked polyethylene (IXPE) thermo acoustic cushion 22 is preferably glued to the core 18, although alternate types of thermo-acoustic underpad cushion 22 may be used, including without limitation agglomerated cork, rubber, and ethylene-vinyl acetate (EVA).

The thermo-acoustic cushion 22 has a thickness in the range of 1.0 mm to and including 1.5 mm thick, which provides several benefits including:

1. Sound deadening which minimizes the transfer of footfall noise from room to room and floor to floor;

2. Acts as a thermal break when the floors are installed over an on-grade concrete slab, thereby creating a warmer floor surface; and 3. Gives the floor a shock-absorbing quality making it more comfortable to walk on.

Figure 5:
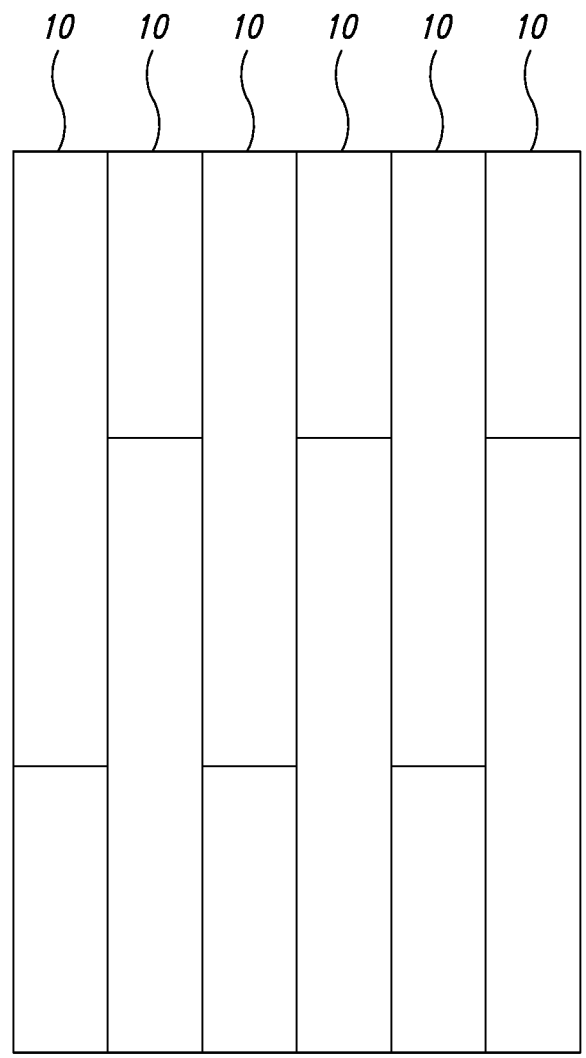
FIG. 5 is an axonometric illustration of a floor formed in accordance with the present disclosure.

As shown in FIG. 5, the individual planks 10 may be combined with one or more other planks 10 to form a floor 30. In addition, a single plank 10 or more than one plank 10 may be combined with pre-existing planks formed by other processes as desired to form the floor 30.

Manufacturing Process

Figure 6A:
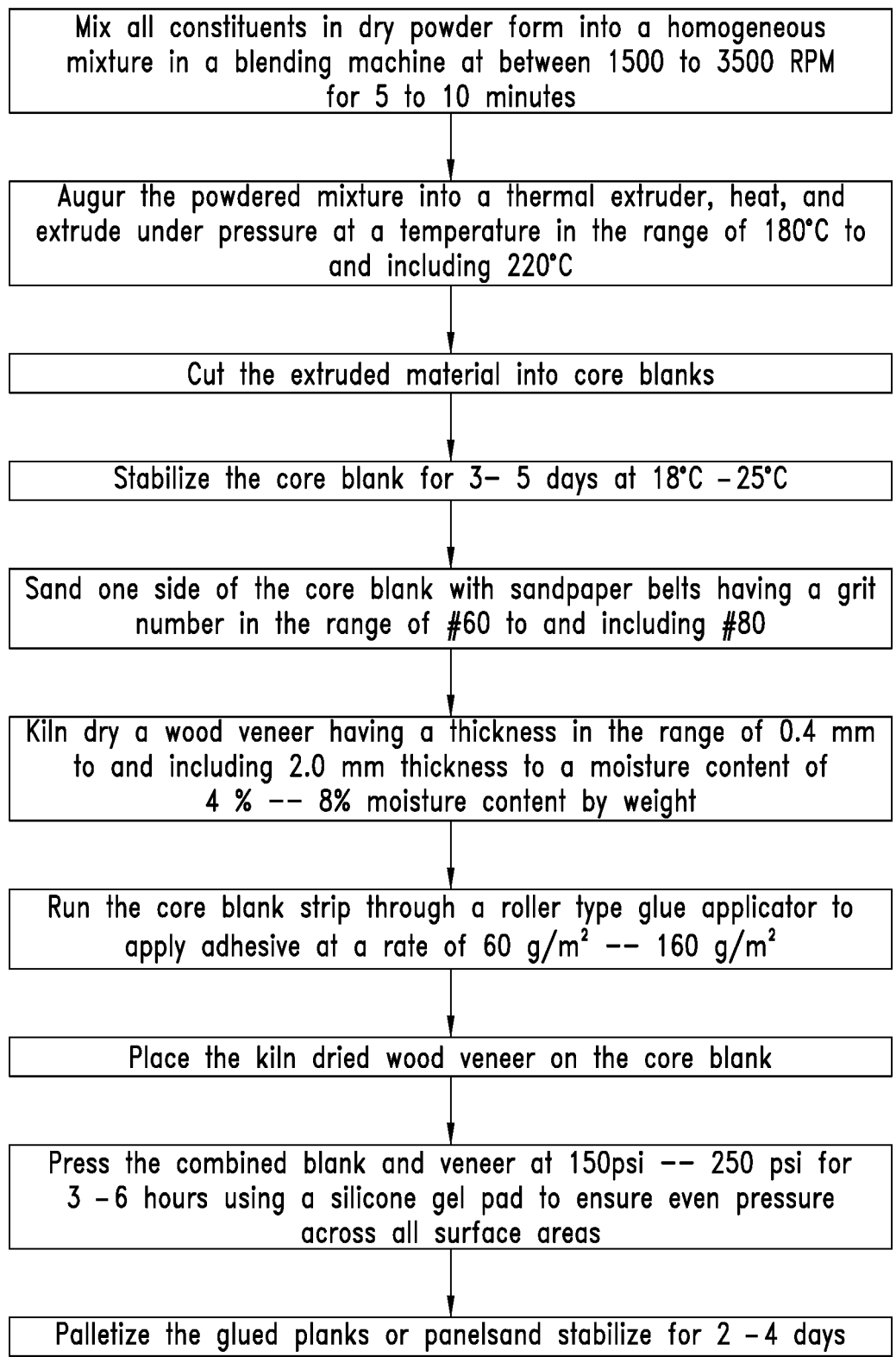
FIGS. 6A and 6B are illustrations of a method of making a floor plank in accordance with the present disclosure.
Figure 6B:
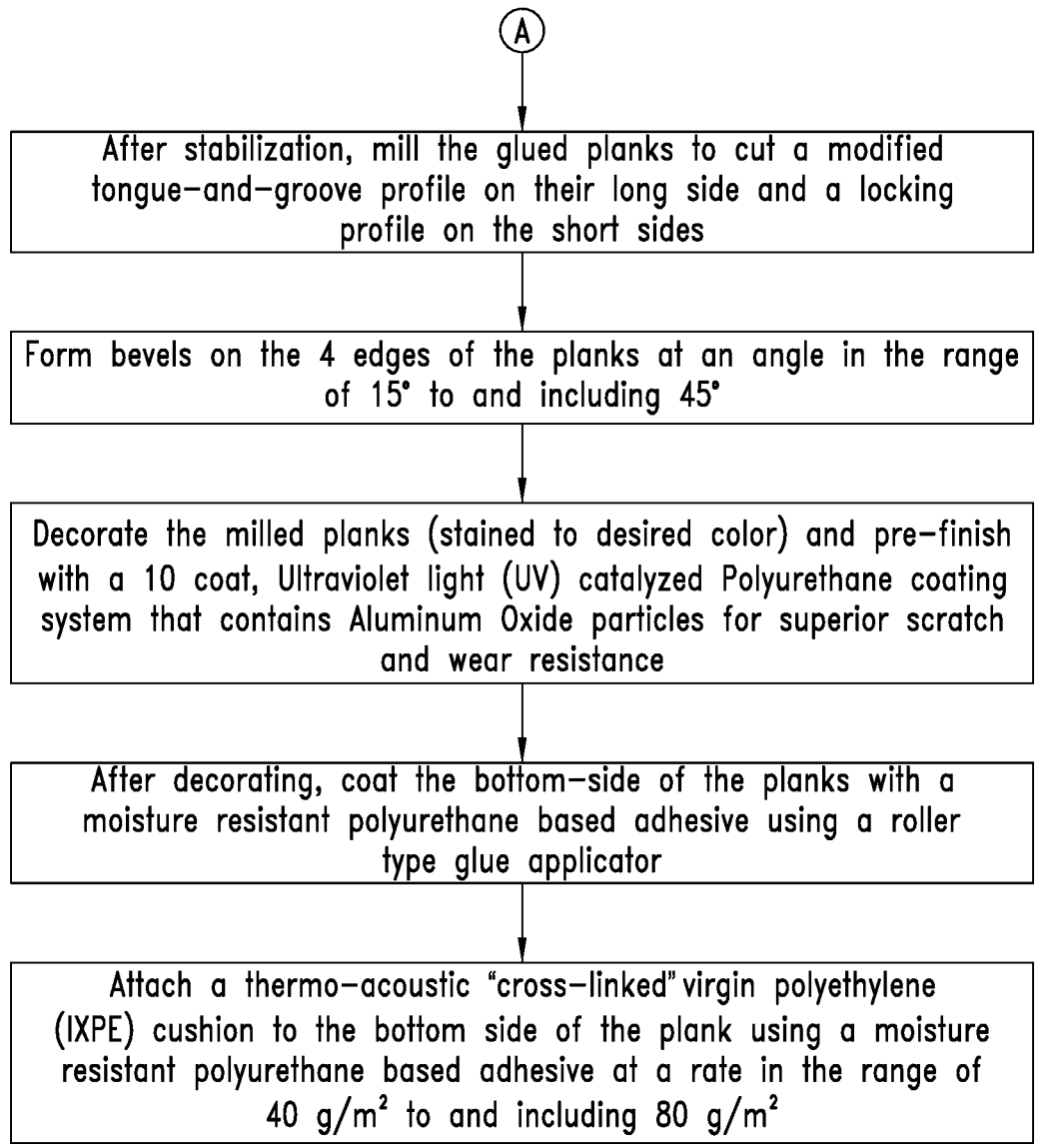

Referring next to FIGS. 6A and 6B, the rigid composite core 18 and the plank 10 as a finished product can be produced by the following process:

i. All of the powdered ingredients described above (Extra-fine calcium carbonate ($CaCO_3$), stabilizer salts, plasticizer, lubricants, and pigments) are mixed in dry powder form into a homogeneous mixture in a blending machine at between 1500 to 3500 RPM for 5 to 10 minutes.

ii. The powdered mixture is placed into a thermal extruder, preferably with an augur, where it is heated and extruded under pressure through an adjustable mold at a temperature of between 180° C. and 220° C. in a continuous process at the desired thickness.

iii. The extruded material is cut into core blanks of a desired width and length, preferably into a rectangular planform shape.

iv. The rigid composite core blanks are left to stabilize for 3 to 5 days at a temperature of between 18° C. and 25° C.

v. The rigid composite core blanks are surface sanded on one side by an inline belt sander using sandpaper belts with a grit number of between #60 and #80.

vi. Hardwood veneers of between 0.4 mm to 2.0 mm in thickness of different species are kiln dried to a moisture content of between 6% to 12% moisture content by weight.

vii. Individual rigid composite core strips are run through a roller type glue applicator that applies moisture resistant polyurethane based adhesive at a rate of between 60 g/m² to 160 g/m² depending on the veneer's thickness and species of wood.

viii. The kiln dried hardwood veneers are manually placed onto the rigid composite core blanks to position and orient them correctly.

ix. The blanks and veneers are next placed into a hydraulic press at between 150 to 250 psi for 3-6 hours depending on the ambient temperature which must be within 5° C. to 35° C. A silicone gel pad is used during pressing process to ensure even pressure across all surface areas of the veneers and the rigid composite core for optimal and consistent glue bond strength.

x. After the gluing process, the assembled panels are palletized and allowed to stabilize for 2-4 days.

xi. After stabilization, the glued planks are next milled on a high-precision double tenon type milling machine that first cuts a modified locking tongue-and-groove profile on their long side, after which it then cuts a locking profile on the ends of planks.

xii. An important part of the milling process is the bevels that are applied to the 4 edges of the planks. The bevels are applied at an angle of between 15° to 45° to allow for a thorough coating of the edges of the hardwood veneers to seal and protect them against post-installation moisture, pet urine, feces, and other contaminants.

xiii. The milled planks are next decorated (stained to desired color) and pre-finished with a 10 coat, Ultraviolet light (UV) catalyzed Polyurethane coating system that contains Aluminum Oxide particles for superior scratch and wear resistance. The details of the coating system are as follows:

Coat #1 comprising a water based adhesion/bonding layer of 10 g/m² to and including 15 g/m² surface density;

Coat #2 comprising a water resistant polyurethane layer of 20 g/m² to and including 30 g/m² surface density;

Coat #3 comprising a flexible polyurethane layer of 12 g/m² to and including 16 g/m² surface density;

Coat #4 comprising a wear resistance polyurethane layer of 20 g/m² to and including 30 g/m² surface density;

Coat #5 comprising a wear resistance polyurethane layer of 20 g/m² to and including 30/m² surface density;

Coat #6 comprising a polyurethane hardening layer of 14 g/m² to and including 20 g/m² surface density;

Coat #7 comprising a polyurethane filler/leveling layer of 10 g/m² to and including 15 g/m² surface density;

Coat #8 comprising a low gloss polyurethane filler layer of 8 g/m² to and including 12 g/m² surface density;

Coat #9 comprising an aluminum oxide anti-scratch layer of 5 g/m² to and including 8 g/m² surface density; and Coat #10 comprising an aluminum oxide anti-scratch layer of 4 g/m² to and including 6 g/m² surface density.

xiv. After milling, the bottom-side of the planks is coated with a moisture resistant polyurethane based adhesive using a roller type glue applicator.

xv. A thermo-acoustic "cross-linked" virgin polyethylene (IXPE) cushion is bonded to the bottom side of the plank using a moisture resistant polyurethane based adhesive at a rate in the range of 40 g/m² to and including 80 g/m².

In accordance with another implementation of the present disclosure, silver ions (Ag+) are included for antimicrobial control. The decorative genuine hardwood veneer is sealed and protected with a specially formulated catalyzed Polyurethane coating that contains Aluminum Oxide particles which provide enhanced wear-resistance against abrasion, as well as silver ions (Ag+), which provide an antimicrobial control capability. The floor comprises a rigid composite core primarily made of PVC and Calcium Carbonate.

The underside of the planks has an attached thermo-acoustic cushion made from "cross-linked" virgin polyethylene (IXPE); cushion thickness is between 1.0 to 1.5 mm thick which provides several benefits including: 1—Sound deadening which minimizes the transfer of footfall noise from room to room and floor to floor. 2—Acts as a thermal break when the floors are installed over an on-grade concrete slab, thereby creating a warmer floor surface. 3—Gives the floor a shock-absorbing quality making it more comfortable to walk on.

Alternate types of thermo-acoustic underpad/cushions may be used with the invention including but not limited to: Agglomerated cork, rubber, ethylene-vinyl acetate (EVA).

Ideally, the planks incorporate a patented modified tongue and groove profile that locks planks together on their long side, as well as a patented drop-lock profile on the ends of the planks that locks the end-seams of the planks together tightly and securely. These patented profile systems allow for the floor to be installed in either a floating or glue-down method. Additionally, the patented profiles create exceptionally tight fitting seams that minimize the ability for moisture from spills or pet accidents from seeping through the floor.

The manufacturing process thereof is further explained below.

COATING SYSTEM: The wood veneer of the flooring is finished/coated with a 10 coat, Ultraviolet light (UV) catalyzed Polyurethane coating system that contains Aluminum Oxide particles for superior scratch and wear resistance; as well as silver ions (Ag+) which give the finish an antimicrobial capability. The silver ion antimicrobial agent is preferably added into the coating system by physical blending through the coating production process. Ideally the silver ion (Ag+) is added in a solid form, preferably at 0.3% concentration to the total coating mass. The Aluminum Oxide (Gr/Kg) has a preferred concentration in the coating layer in the range of 3.0% to and including 5.0%.

The silver ions (Ag+) in the top layer of the coating have the capability to kill multiple species of harmful pathogens, including different types of bacteria, mold and viruses when these pathogens come into contact with the surface of the floor. The effectiveness of the coating's antimicrobial capability is constant; it does not diminish or lose effectiveness over time.

The UV cured scratch resistant finish has an antimicrobial capability using the aforesaid silver ion (Ag+) technology that is designed to help protect both people and pets from multiple species of pathogens, including bacteria, mold and viruses that may be deposited on the floor from feet, paws, footwear, airborne sources and other sources. On contact, the silver ions in the coating will attack and penetrate the cell walls of the pathogens, first inhibiting their ability to multiply and ultimately killing them.

A further improvement is the use of a patented click-type locking system. The sides and ends of the planks are milled on a high-precision double tenon type milling machine that first cuts the patented "click" type modified tongue and groove profile that locks planks together on their long side. After the long-side of the planks is milled, the machine then cuts the patented "drop-lock" profile that locks the ends of planks together on their short side. The modified tongue and groove profile that locks planks together on their long side, as well as a patented drop-lock profile on the ends of the planks that locks the end-seams of the planks together tightly and securely. These patented profile systems allow the floor to be installed in either a floating or glue-down method. In addition to these patented profiles also create exceptionally tight fitting seams that minimize the ability for moisture from spills or pet accidents from seeping through the floor.

The process described above is hence modified to include the new antimicrobial coating and the modified rigid composite core as follows:

i. All ingredients are mixed in dry powder form into a homogeneous mixture in a blending machine at between 1500 to 3500 RPM for 5 to 10 minutes.

ii. The powdered mixture is augured into a thermal extruder where it is heated and extruded under pressure through an adjustable mold at a temperature of between 180° C. and 220° C. in a continuous process at the desired thickness.

iii. The extruded material is cut into blanks of the desired width and length.

iv. The rigid composite core blanks are left to stabilize for 3 to 5 days at a temperature of between 18° C. and 25° C.

v. The rigid composite core blanks are surface sanded on one side by an inline belt sander using sandpaper belts with a grit number of between #60 and #80.

vi. Hardwood veneers of between 0.4 mm to 2.0 mm in thickness of different species are kiln dried to a moisture content of between 4% to 8% moisture content by weight.

vii. Individual rigid composite core strips are run through a roller type glue applicator that applies a moisture resistant polyurethane based adhesive at a rate of between 60 grams to 160 grams/M2 depending on the veneer's thickness and species of wood.

viii. The kiln dried hardwood veneers are manually placed onto the rigid composite core blanks to position and orient them correctly.

ix. The blanks and veneers are next placed into a hydraulic press at between 150 to 250 psi for 3-6 hours depending on the ambient temperature, which must be within 5° C. to 35° C. A silicone gel pad is used during pressing process to ensure even pressure across all surface areas of the veneers and the rigid composite core for optimal and consistent glue bond strength.

x. After the gluing process, the assembled panels are palletized and allowed to stabilize for 2-4 days.

xi. After stabilization, the glued planks are next milled on a high-precision double tenon type milling machine that first cuts a modified tongue and groove profile on their long side, after which it then cuts a locking profile on the ends of planks.

xii. An important part of the milling process is the bevels that are applied to the 4 edges of the planks. The bevels are applied at an angle of between 15° to 45° to allow for a thorough coating of the edges of the hardwood veneers to seal and protect them against post-installation moisture, pet urine, feces and other contaminants.

xiii. The milled planks are next decorated (stained to desired color) and pre-finished with a 10 coat, Ultraviolet light (UV) catalyzed Polyurethane coating system that contains Aluminum Oxide particles for superior scratch and wear resistance. The details of the coating system are as follows:

Coat #1—Water based adhesion/bonding layer: 10-15 g/m$^2$;
Coat #2—Water resistant polyurethane layer: 20-30 g/m$^2$;
Coat #3—Flexible polyurethane layer: 12-16 g/m$^2$;
Coat #4—Wear resistance polyurethane layer: 20-30/m$^2$;
Coat #5—Wear resistance polyurethane layer: 20-30/m$^2$;
Coat #6—Polyurethane hardening layer: 14-20 g/m$^2$;
Coat #7—Polyurethane filler/leveling layer: 10-15 g/m$^2$;
Coat #8—Low gloss polyurethane filler layer: 8-12 g/m$^2$;
Coat #9—Aluminum Oxide anti-scratch layer: 5-8 g/m$^2$; and
Coat #10—Aluminum Oxide anti-scratch and silver ion Ag+ antimicrobial layer: 4-6 g/m$^2$ xiv. After milling, the bottom-side of the planks (invention) is coated with a moisture resistant polyurethane based adhesive using a roller type glue applicator.

xv. A thermo-acoustic "cross-linked" virgin polyethylene (IXPE) cushion is bonded to the bottom side of the plank using a moisture resistant polyurethane based adhesive at a rate of between 40 grams to 80 grams/M2.

The various embodiments described above can be combined to provide further embodiments. For example, while the foregoing manufacturing steps are described individually, they may be combined together in one or more various combinations. In addition, one or more of the steps may be divided into separate steps or substeps.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A plank, comprising:
    a rigid, composite core having an upper side and a underside, the core being thermally stable and formed of PVC and calcium carbonate material that does not include ortho-phthalates;
    a wood veneer having a lower surface on the upper side of the core and further including an exposed surface;
    a protective coating on the exposed surface of the wood veneer, the protective coating formed of catalyzed Polyurethane having aluminum oxide particles and a silver ion (Ag+) for antimicrobial effect at a concentration of about 0.3%; and
    a thermo-acoustic cushion coating on the underside of the core.

2. The plank of claim 1 wherein the protective coating comprises a catalyzed polyurethane and aluminum oxide coating.

3. The plank of claim 2 wherein the wood veneer comprises a hardwood veneer having a thickness in the range of 0.4 mm to and including 2.0 mm in thickness, and it is glued to the core.

4. The plank of claim 3 wherein the rigid composite core has a thickness in the range of 3.5 mm to 8.0 mm and is formed of non-foam material.

5. The plank of claim 4 wherein the core has a density (specific gravity) in the range of 2.0 grams per cm$^3$ to and including 2.4 grams per cm$^3$.

6. The plank of claim 5 wherein the thermo-acoustic cushion is constructed from cross-linked virgin polyethylene with a thickness in the range of 1.0 mm to and including 1.5 mm.

7. The plank of claim 6 wherein the plank has an expansion contraction coefficient that is less than 0.04% between the temperatures of 10° C. and 40° C., and the floor can withstand high surface temperatures of up to 50° C. when the floors are exposed to direct sunlight.

8. The plank of claim 7 wherein the plank is dimensionally stable in humidity levels ranging from 15% RH to 75% RH.

9. The plank of claim 1 wherein the core comprises polyvinylchloride (PVC) powder from 20% to and including 40% by weight, extra-fine calcium carbonate (CaCO$_3$) from 60% to and including 80% by weight, stabilizer salts from 1% to and including 3% by weight, plasticizer from 1% to and including 2% by weight, lubricants from 0.4% to and including 1% by weight, and pigments from 0.4% to and including 1% by weight.

10. The plank of claim 1 wherein the core is ultra-low in volatile organic compound (VOC) content.

11. The plank of claim 1 wherein the attached cushion comprises cross-linked virgin polyethylene (IXPE), has a thickness in the range of 1.0 mm to and including 1.5 mm thick.

12. The plank of claim 1 wherein the cushion is formed from one among cross-linked virgin polyethylene, agglomerated cork, rubber, and ethylene-vinyl acetate (EVA).

13. The plank of claim 1 wherein the plank has a rectilinear shape with a pair of opposing long sides and a pair of opposing short sides, and wherein the plank further includes a modified locking tongue-and-groove profile formed on at least the pair of opposing long sides that enables locking the plank together with adjacent planks to form a floor.

14. A floor, comprising:
    a plurality of planks, each plank including:
        a rigid, composite core having an upper side and an underside, the core formed of PVC and calcium carbonate material;
        a wood veneer having a lower surface on the upper side of the core and further including an exposed surface;
        a protective coating on the exposed surface of the wood veneer, the protective coating formed of catalyzed Polyurethane having aluminum oxide particles and a silver ion (Ag+); and
        a thermo-acoustic cushion coating on the back surface of the core.

15. The floor of claim 14 wherein the protective coating has a mass that comprises a catalyzed polyurethane and aluminum oxide coating, and the silver ion (Ag+) has a concentration of about 0.3% of the total protective coating mass.

16. The floor of claim 14 wherein the wood veneer comprises a hardwood veneer having a thickness in the range of 0.4 mm to and including 2.0 mm in thickness, and it is glued to the core.

17. The floor of claim 16 wherein the rigid composite core has a thickness in the range of 3.5 mm to 8.0 mm and is formed of non-foam material.

18. The floor of claim 17 wherein the core has a density (specific gravity) in the range of 2.0 grams per cm$^3$ to and including 2.4 grams per cm$^3$.

19. The floor of claim 18 wherein the thermo-acoustic cushion is constructed from cross-linked virgin polyethylene with a thickness in the range of 1.0 mm to and including 1.5 mm.

20. The floor of claim 19 wherein the plank has an expansion contraction coefficient that is less than 0.04% between the temperatures of 10° C. and 40° C., and the floor can withstand high surface temperatures of up to 50° C. when the floors are exposed to direct sunlight.

21. The floor of claim 20 wherein the plank is dimensionally stable in humidity levels ranging from 15% RH to 75% RH.

22. The floor of claim 14 wherein the core comprises polyvinylchloride (PVC) powder from 20% to and including 40% by weight, extra-fine calcium carbonate ($CaCO_3$) from 60% to and including 80% by weight, stabilizer salts from 1% to and including 3% by weight, plasticizer from 1% to and including 2% by weight, lubricants from 0.4% to and including 1% by weight, and pigments from 0.4% to and including 1% by weight.

23. The floor of claim 14 wherein the core is ultra-low in volatile organic compound (VOC) content.

24. The floor of claim 14 wherein the attached cushion comprises cross-linked virgin polyethylene (IXPE), has a thickness in the range of 1.0 mm to and including 1.5 mm thick.

25. The floor of claim 14 wherein the cushion is formed from one among cross-linked virgin polyethylene, agglomerated cork, rubber, and ethylene-vinyl acetate (EVA).

26. The floor of claim 14 wherein each plank has a rectilinear shape with a pair of opposing long sides and a pair of opposing short sides, and wherein each plank further includes a modified locking tongue-and-groove profile formed on at least pair of opposing long sides of each plank that enables locking the planks together with adjacent planks to form the floor in either a floating or glue-down method.

27. The floor of claim 14 wherein each plank includes a pair of opposing long sides and a pair of opposing short sides, and each long side has a click-type modified tongue and groove profile that locks adjacent planks together along their adjacent long sides and each short side has a drop-lock end profile that locks ends of adjacent planks together.

* * * * *